United States Patent
Torre (10) Patent No.: US 9,958,539 B2
(45) Date of Patent: May 1, 2018

(54) REAL APERTURE RADAR SYSTEM FOR USE ON BOARD A SATELLITE AND FOR MARITIME SURVEILLANCE APPLICATIONS

(71) Applicant: THALES ALENIA SPACE ITALIA S.p.A. CON UNICO SOCIO, Rome (IT)

(72) Inventor: Andrea Torre, Rome (IT)

(73) Assignee: Thales Alenia Space Italia S.p.A. Con Unico Socio, Rome (IT)

( * ) Notice: Subject to any disclaimer, the term of this patent is extended or adjusted under 35 U.S.C. 154(b) by 894 days.

(21) Appl. No.: 14/208,162

(22) Filed: Mar. 13, 2014

(65) Prior Publication Data

US 2014/0266899 A1 Sep. 18, 2014

(30) Foreign Application Priority Data

Mar. 13, 2013 (IT) .............................. TO2013A0196

(51) Int. Cl.
| | |
|---|---|
| *G01S 13/02* | (2006.01) |
| *G01S 13/42* | (2006.01) |
| *G01S 13/24* | (2006.01) |
| *G01S 13/00* | (2006.01) |

(52) U.S. Cl.
CPC .............. *G01S 13/02* (2013.01); *G01S 13/24* (2013.01); *G01S 13/426* (2013.01)

(58) Field of Classification Search
CPC ........ G01S 13/24; G01S 13/426; G01S 13/02; G01S 13/422
USPC ......................................................... 342/371
See application file for complete search history.

(56) References Cited

U.S. PATENT DOCUMENTS

| | | | | |
|---|---|---|---|---|
| 3,778,829 A | * | 12/1973 | Longuemare, Jr. ... | G01S 13/685 342/150 |
| 3,898,660 A | * | 8/1975 | Munster ................ | G01S 13/282 342/201 |
| 4,136,341 A | * | 1/1979 | Mulder ................. | G01S 7/2813 342/132 |
| 4,978,960 A | * | 12/1990 | Newcomb .............. | G01S 13/89 342/191 |
| 5,745,069 A | * | 4/1998 | Gail ...................... | G01S 7/2813 342/162 |
| 6,137,437 A | * | 10/2000 | Lin et al. .............. | G01S 13/422 |

(Continued)

OTHER PUBLICATIONS

Marzoug, et al, Design of a Spaceborne Radar for Tropical Rain Mapping at the Climatological Scale, vol. 1, pp. 247-248, Sep. 1998.

(Continued)

*Primary Examiner* — Bernarr E Gregory
(74) *Attorney, Agent, or Firm* — McCarter & English, LLP (57) ABSTRACT

The present invention regards a method of operation of a real aperture radar system for surveillance of the Earth's surface, said real aperture radar system being installed on a space vehicle/platform that moves in a direction of flight and comprising a transceiving antenna, or a transmitting antenna and a receiving antenna, which is/are electronically steerable. All the radar pulses are transmitted: with a predefined pulse repetition frequency and a predefined timing of the scanning cycle such that to guarantee a complete coverage of each of the N swaths parallelly to the direction of flight; and by using a frequency agility technique.

6 Claims, 3 Drawing Sheets

(56) References Cited

U.S. PATENT DOCUMENTS

| 8,125,373 B2* | 2/2012 | Lee | G01S 13/34 |
| | | | 342/118 |
| 2010/0141507 A1* | 6/2010 | Richard | G01S 13/90 |
| | | | 342/25 B |
| 2012/0319892 A1* | 12/2012 | Calabrese | G01S 13/9023 |
| | | | 342/25 C |

OTHER PUBLICATIONS

Lancome et al., Chapter 11—In: Air and Spaceborne Radar Systems: An Introduction, pp. 177-188, 2001.

Richard, et al., An Innovative Spaceborne Radar Concept for Global Maritime Surveillance: Description and Performance Demonstration, Geoscience and Remote Sensing Symposium (Igarss), 2010 IEEE International, IEEE, Piscatawy, NJ, USA, pp. 257-259, Jul. 2010.

Kellogg et al., NASA's Soil Moisture 1-17 Active Passive (SMAP) Observatory, Aerospace Conference, 2013 IEEE, pp. 1-20, Mar. 2013.

Italian Search Report dated Nov. 19, 2013.

* cited by examiner

REAL APERTURE RADAR SYSTEM FOR USE ON BOARD A SATELLITE AND FOR MARITIME SURVEILLANCE APPLICATIONS

TECHNICAL SECTOR OF THE INVENTION

The present invention regards a real aperture radar (RAR) system for use on board a vehicle/platform at high altitude, specifically a space vehicle/platform, for example a satellite. In particular, the present invention finds advantageous, but not exclusive, application in surveillance of the Earth's surface, specifically in maritime surveillance, i.e., in surveillance of seas and oceans.

STATE OF THE ART

Figure 1:
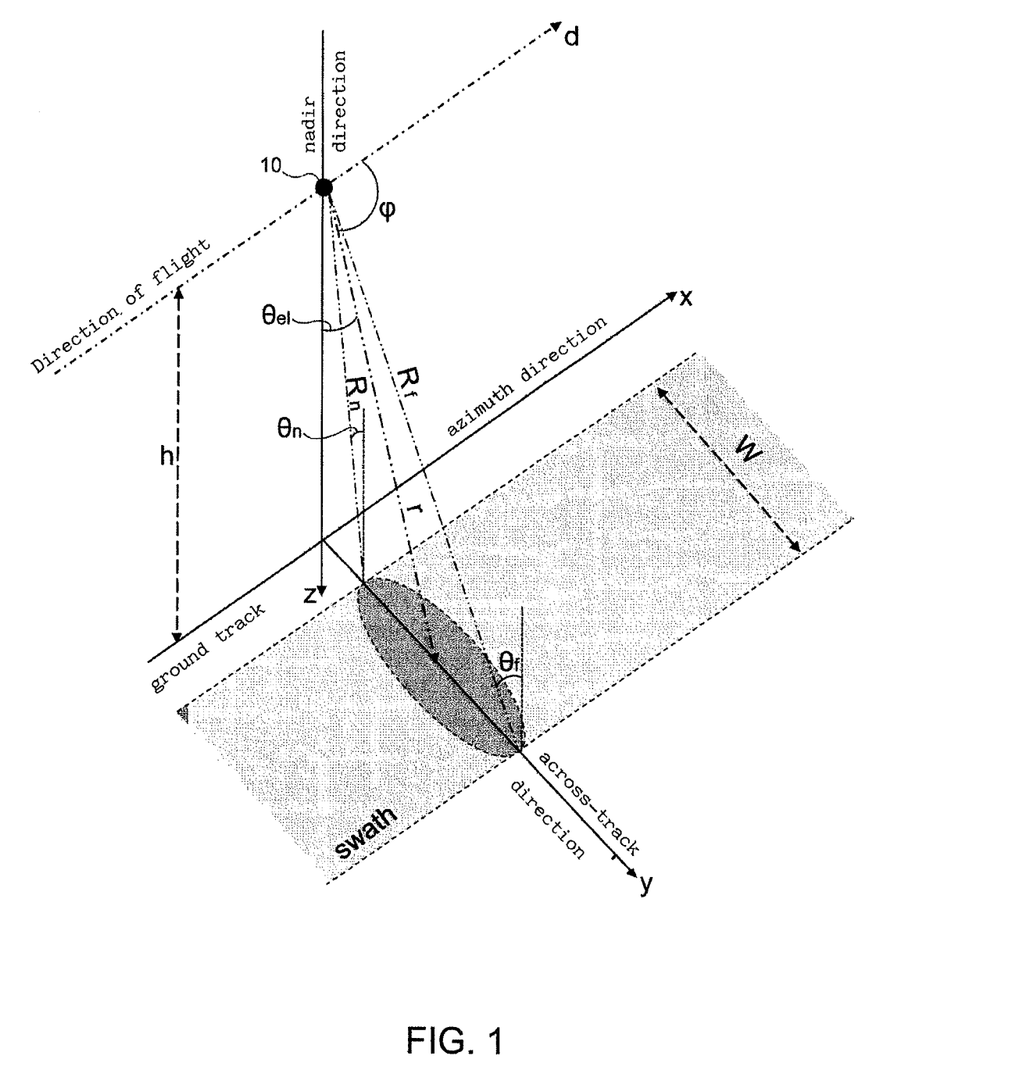
FIG. 1 is a schematic illustration of a typical reference geometry for observation and surveillance of the Earth's surface via a real aperture radar.

FIG. 1 is a schematic illustration not in scale of a typical reference geometry for observation and surveillance of the Earth's surface via a real aperture radar (referred to hereinafter, for simplicity of description, as "RAR sensor/system" or also simply "RAR"). In this regard, it is here intended to emphasize the fact that in FIG. 1 (and also in a subsequent FIG. 2, which will be presented and described in what follows) the Earth's surface is (and will be) illustrated as "flat" merely for convenience and simplicity of illustration and description, without this implying any loss of generality.

In particular, FIG. 1 is a schematic illustration of a RAR sensor 10 that is transported in flight/orbit by an air/space vehicle/platform (not shown in FIG. 1 for simplicity of illustration), such as for example an aeroplane or an unmanned aerial vehicle (UAV) or a satellite, in a direction of flight d at a height h (with respect to the Earth's surface) assumed substantially constant. As is known, the height h of the RAR sensor 10 is measured in a direction of nadir z that passes through said RAR sensor 10 (in particular, that passes through the centre of phase of the antenna of the RAR sensor 10) and is orthogonal to the Earth's surface and to the direction of flight d.

The ground track of the RAR sensor 10 identifies a direction of azimuth x that is parallel to the direction of flight d and is orthogonal to the direction of nadir z, while a so-called "across-track" direction y, which is orthogonal both to the direction of nadir z and to the direction of azimuth x, identifies, together with the direction of azimuth x, a plane xy tangential to the Earth's surface.

In use, the RAR sensor 10, via an appropriate antenna (not shown in FIG. 1 for simplicity of illustration), transmits a series of radar pulses in a direction of pointing (or of illumination or observation) r that forms with the direction of nadir z an elevation angle $\theta_{el}$ and with the direction of flight d a squint angle φ that is (substantially) a right angle. Furthermore, assuming that the RAR sensor 10 is a monostatic radar, said RAR sensor 10, in use receives the signals back-scattered from the Earth's surface via the same antenna as the one used for transmission.

In particular, the RAR sensor 10 illuminates with the radar pulses, and then receives the corresponding back-scattered signals from, a strip of the Earth's surface, universally known as "swath", that extends principally parallel to the direction of azimuth x and that, in a direction parallel to the across-track direction y, has a given width W that depends principally upon the width of the antenna beam of the RAR sensor 10 in the plane of elevation zy.

As illustrated in FIG. 1, the line joining the RAR sensor 10 to the edge of the swath closest to the ground track of said RAR sensor 10 forms, with the normal to the plane xy tangential to the Earth's surface in the specific point considered, a first angle of incidence $\theta_n$, whereas the line joining the RAR sensor 10 to the edge of the swath furthest from the ground track of said RAR sensor 10 forms, with the normal to the plane xy tangential to the Earth's surface in the specific point considered, a second angle of incidence $\theta_f$, with $\theta_n < \theta_f$.

Once again with reference to FIG. 1, the edge of the swath closest to the ground track of said RAR sensor 10 is located at a distance (slant range) $R_n$ from said RAR sensor 10 and the edge of the swath furthest from the ground track of said RAR sensor 10 is located at a distance (slant range) $R_f$ from said RAR sensor 10, obviously, with $R_n < R_f$.

In the sequel of the description, the following definitions will be used, which are amply known both, in general, in the sector of radar systems and, in particular, in the sector of real aperture radar systems.

Probability of detection—by "probability of detection" is meant the statistical likelihood of a radar detecting the presence of a target effectively present in a noisy environment.

Probability of false alarm—by "probability of false alarm" is meant the statistical likelihood of a radar detecting the presence of a target that is not actually present in a noisy environment.

Spatial resolution—by "spatial resolution" is meant the shortest distance, generally expressed in meters, between two identical targets such that a radar is able to determine the presence of two targets and not of a single target.

Resolution in azimuth—by "resolution in azimuth" is meant the spatial resolution of a radar in the direction of azimuth (for example, with reference to FIG. 1, in the direction x).

Resolution in range—by "resolution in range" is meant the spatial resolution of a radar in the across-track direction (for example, with reference to FIG. 1, in the direction y).

Radar coverage—by "radar coverage" is meant the area that can be observed by a radar.

Pulse repetition frequency (PRF)—by "pulse repetition frequency" (referred to hereinafter, for simplicity, also as PRF) is meant the frequency at which the radar pulses are transmitted.

Pulse repetition interval (PRI)—by "pulse repetition interval" (referred to hereinafter, for simplicity, as PRI) is meant the time that elapses between transmission of two successive pulses. As is known, PRI=1/PRF.

Echo—by "echo" is meant the return signal received by a radar and coming from objects illuminated by a radar pulse transmitted by said radar.

Clutter—by "clutter" is meant an undesired echo.

Sea clutter—by "sea clutter" is meant the return signal from an area of sea in which targets are not present.

Resolution cell—by "resolution cell" is meant the elementary area, of land or sea, supplied by a radar after processing of the signal received.

Angle of incidence—by "angle of incidence" is meant the angle formed between the segment of straight line joining a radar and a point observed and the normal to the plane tangential to the Earth's surface in the point observed (for example, with reference to FIG. 1, the angles $\theta_n$ and $\theta_f$).

As is known, in the case of applications of maritime surveillance, i.e., in order to detect targets, in particular ships, on the surface of seas and/or oceans, a radar system transported in flight/orbit by an air/space vehicle/platform in use:

- transmits, with a certain PRF and via a transmitting antenna, radar pulses towards the sea; and then
- receives, via a receiving antenna, and processes the echo signal back-scattered from the scene observed.

In the case where a radar system uses one and the same antenna for transmitting and receiving, said radar system is said to be monostatic, whereas in the case where a radar system uses two different antennas, said radar system is said, instead, to be bistatic.

In order to improve the performance of a radar system for maritime surveillance, it is important to reduce the number of ambiguous echoes and their amplitude. The echo of a given target is characterized by its time of reception and by its Doppler frequency resulting from the movement of the air/space vehicle/platform.

As is known, an ambiguous echo (or ambiguity) is a parasitic echo that:

- is caused by the "response" of an area that is different from that of the "useful" resolution cell and that is directly illuminated by the radar pulse considered at the origin of said echo; and
- is superimposed exactly in time and at the Doppler frequency on the "useful" signal.

These ambiguities are due to the pulsed operation of the radar. In particular, the ambiguities may be of two types:
1) ambiguity in range, i.e., echoes coming from areas situated in the direction normal to the direction of flight (locus of zero-Doppler points) and corresponding to pulses prior or subsequent to the one considered; and
2) ambiguity in azimuth, i.e., echoes coming from areas which are situated at the same distance as the useful area and the Doppler frequency of which is ambiguous with respect to the Doppler frequency of the useful area (pulsed transmission renders the Doppler spectrum of the echo signals periodic).

Typically, the probability of detection of a radar system for surveillance of the oceans must be equal to or greater than 90%, and the probability of false alarm must be equal to or smaller than $10^{-7}$. These performance values require spatial resolutions in range of the order of tens of meters.

To guarantee a global coverage of the surface of the sea, typically a swath is considered that has a width of approximately 1000 km. To reduce to a minimum the ambiguity in range, typically a PRF of the order of 50/100 Hz is used.

The spatial resolution in range is typically fixed at a few tens of meters (typically between 50 and 300 m) as a function of the band of the signal transmitted. The spatial resolution in azimuth is typically of the order of a few kilometers and is determined by the footprint of the antenna beam on the terrain in azimuth. For instance, the spatial resolution in azimuth of a radar system that is installed on board a satellite having a height of 600 km, which functions in the X band at 9.6 GHz and that uses an antenna having a length of 10 m and a direction of observation with an angle of incidence of approximately 70°, is typically 4.5 km.

In this regard, the U.S. patent application No. US 2010/141507 A1 published on Jun. 10, 2010 (which in what follows will be identified, for simplicity, as Ref1) and the article by J. Richard et al. entitled: "*AN INNOVATIVE SPACEBORNE RADAR CONCEPT FOR GLOBAL MARITIME SURVEILLANCE: DESCRIPTION AND PERFORMANCE DEMONSTRATION*", IEEE Geoscience and Remote Sensing Symposium, IGARSS 2010, Jul. 25, 2010, pp. 257-259, (which in what follows will be identified, for simplicity, as Ref2) substantially describe one and the same radar device for maritime surveillance, which is installed on board a vehicle at high altitude, in particular a satellite, uses a PRF of the order of 100 Hz and an angle of incidence of approximately 70°, and is able to observe a swath having a width of approximately 1000 km with a resolution in azimuth of a few tens of meters and a resolution in range of a few tens of meters.

In particular, the radar device described in Ref1 and Ref2 is a partial-synthetic-aperture radar that uses a scan-on-receive technique, i.e., that uses:

- in transmission, an antenna beam that is very wide in the plane of elevation in such a way as to illuminate a swath having a width of approximately 1000 km; and,
- in reception, an antenna beam that, in the plane of elevation, is narrower than the one used in transmission (in particular, it is P times narrower, with $P \geq 5$).

Furthermore, the above partial-synthetic-aperture radar comprises reception scanning means, which, in reception, dynamically point the reception antenna beam by following the directions of arrival of the echo so as to increase the reception gain.

Finally, the above partial-synthetic-aperture radar also exploits a frequency agility technique between successive pulses.

Furthermore, the article by M. Marzoug at al. entitled: "*DESIGN OF A SPACEBORNE RADAR FOR TROPICAL RAIN MAPPING AT THE CLIMATOLOGICAL SCALE*", IEEE Geoscience and Remote Sensing Symposium, IGARSS '88, vol. 1, Sep. 12, 1988, pp. 247-248, (which in what follows will be identified, for simplicity, as Ref3) describes a spaceborne radar designed for measuring the level of tropical rainfall.

In particular, the radar described in Ref3 carries out measurements of volume in which the three-dimensional resolution cell is given:

- in height, by the resolution in range (linked to the band of the signal transmitted); and
- as regards the base, by the ground footprint of the antenna (linked to the width of the antenna beam in azimuth and elevation).

In detail, the radar described in Ref3 operates at an operating frequency close to 14 GHz using frequency agility (in particular, it uses two frequencies shifted by 10 MHz), uses a PRF of 3500 Hz, and has a ground footprint at the nadir of 1.6 km and a resolution in range of 250 m.

In use, the radar described in Ref3 carries out, through a scan of the antenna beam, sample acquisitions of discrete areas of the Earth's surface spaced apart from one another, both in the direction of azimuth and in the across-track direction, by 3 km in order to perform sample volumetric measurements. Furthermore, the radar described in Ref3 is able to execute the aforesaid sample acquisitions on three parallel swaths, each of which has a width of 100 km.

Operation of the radar described in Ref3 is clearly inapplicable to a radar system for maritime surveillance. In fact, as is known and as has been previously described, a radar system for maritime surveillance has the purpose of identifying a target over a very extensive area of sea and, for this purpose, performs surface measurements in which the two-dimensional resolution cell is limited by the resolution on the Earth's surface (linked to the band of the pulse transmitted and the angle of incidence) and by the size of the antenna beam in the direction of flight.

OBJECT AND SUMMARY OF THE INVENTION

As previously described, a radar system for applications of maritime surveillance must be able to observe very extensive swaths, in particular swaths having a width of the order of approximately 1000 km, with a spatial resolution of the order of tens of meters, or, in any case, with a spatial resolution comparable with the dimensions of the targets that it is intended to detect, in particular ships.

Object of the present invention is hence to provide a real aperture radar system (RAR) for use on board a vehicle/platform at high altitude, in particular on board a space vehicle/platform, specifically on board a satellite, which is able to guarantee the aforesaid performance, i.e., which is able to observe very extensive swaths, in particular swaths with a width of the order of approximately 1000 km, with a spatial resolution of the order of tens of meters, or, in any case, with a spatial resolution comparable with the dimensions of the targets that it is intended to detect, in particular ships.

The aforesaid object is achieved by the present invention in so far as it concerns a real aperture radar system for surveillance of the Earth's surface and the corresponding method of operation, according to what is defined in the annexed claims.

In particular, the present invention concerns a method of operation of a real aperture radar system for surveillance of the Earth's surface, said real aperture radar system being installed on a space vehicle/platform that moves in a direction of flight and comprising a transceiving antenna, or a transmitting antenna and a receiving antenna, which is/are electronically steerable.

Said method comprises:
a) transmitting, via the transceiving/transmitting antenna, a series of M radar pulses towards a swath of the Earth's surface parallel to the direction of flight using an antenna beam pointed at said swath, wherein M is an integer greater than two;
b) for each of the M radar pulses transmitted, receiving, via the transceiving/receiving antenna, a corresponding echo signal during the time interval that elapses between transmission of said radar pulse and transmission of the following radar pulse using the same antenna beam as the one used for transmitting the M radar pulses; and
c) carrying out elevation scanning cycles, wherein each elevation scanning cycle is carried out by repeating N times the operations a) and b) and by electronically changing, each time, the direction of pointing in elevation of the antenna beam so that, at each elevation scanning cycle, the radar pulses are transmitted towards, and the echo signals are received from, N swaths of the Earth's surface that are parallel to the direction of flight and are adjoining or partially overlapping, wherein N is an integer greater than one.

Furthermore, according to the present invention, all the radar pulses are transmitted:
with a predefined pulse repetition frequency and a predefined timing of the scanning cycle such that to guarantee a complete coverage of each of the N swaths parallelly to the direction of flight; and
by using a frequency agility technique.

Preferably, the frequency agility technique is implemented by using the following characteristics:
all the radar pulses transmitted have one and the same predefined bandwidth;
the M radar pulses transmitted, in an elevation scanning cycle, towards one and the same swath occupy, each, a respective frequency band that has said predefined bandwidth and is identified by a respective reference frequency that is spaced apart, from the reference frequencies of the radar pulses transmitted immediately before and immediately after, by a first frequency hop that is greater than said predefined bandwidth;
the reference frequencies of the M radar pulses transmitted, in an elevation scanning cycle, towards one and the same swath are selected around one and the same central transmission frequency; and
in each elevation scanning cycle there is used, for each swath, a respective central transmission frequency that is spaced apart, from the central transmission frequencies used in said elevation scanning cycle for the other swaths, by a second frequency hop that is greater than the first frequency hop.

BRIEF DESCRIPTION OF THE DRAWINGS

For a better understanding of the present invention, some preferred embodiments, provided purely by way of explanatory and non-limiting example, will now be illustrated with reference to the annexed drawings (not in scale), wherein.

DETAILED DESCRIPTION OF PREFERRED
EMBODIMENTS OF THE INVENTION

The present invention concerns a RAR system for use on board a vehicle/platform at high altitude, in particular a space vehicle/platform, specifically a satellite, for applications of surveillance of the Earth's surface, in particular for applications of maritime surveillance. In what follows, the present invention will be described, for simplicity of presentation and without this implying any loss of generality, with explicit reference to the case of a monostatic RAR system. Of course, the principles of operation described in what follows for the monostatic case may be applied, mutatis mutandis, also to the case of a bistatic RAR system.

The probability of detection of a radar system is directly linked to the signal-to-noise ratio (SNR) and to the signal-to-clutter ratio (SCR). The greater the SNR and the SCR, the higher the probability of detection and the lower the probability of false alarm.

High values of SNR and SCR can be obtained by increasing the power of the signal transmitted and/or the antenna gain, in particular, in the case of a monostatic radar, the gain of the single antenna used for transmitting and receiving, or, in the bistatic case, the gain of the transmitting antenna and the gain of the receiving antenna.

High values of SNR and SCR can be obtained also by adding a number of successive echoes. To be able to do this, it is necessary for the noise and the clutter to be uncorrelated between one radar pulse and the following one. Whereas this is true for noise of a thermal type, it is not true for clutter in the case where the temporal distance between two echoes is less than the time of decorrelation of the clutter.

The present invention stems from the intuition of the applicant of increasing the SNR and the SCR of a RAR system by increasing the antenna gain used for transmitting and receiving, keeping the size of the swath unvaried (approximately 1000 km) and exploiting a technique that enables decorrelation of the clutter.

In particular, the ideas underlying the present invention are:

the use, both in transmission and in reception, of a "narrow" antenna beam, i.e., with high gain,
   with scanning in the plane of elevation for observing N (with N>1) sub-swaths (for example, five adjoining or partially overlapping sub-swaths, each having a width of approximately 200 km), which together form the global swath of interest (for example, having a width of approximately 1000 km); and
   with a gain such that to enable detection of a target in sea clutter;
the use of an operating PRF (for example, 500 Hz) higher than the ones typically used for applications of maritime surveillance (normally comprised between 50 and 100 Hz) so as to obtain a number of echoes sufficient to guarantee the required integration gain; and
the use of a frequency agility technique for decorrelating the sea clutter.

In detail, the use of a "narrow" antenna beam with high gain, with scanning in the plane of elevation so as to observe N sub-swaths, which together form the global swath of interest enables a high value of SNR to be obtained. The use of a high operating PRF (for example, 500 Hz) enables a number of echoes to be obtained sufficient to guarantee the required integration gain, but unfortunately is liable, at the same time, to increase the correlation of the sea clutter between one transmitted radar pulse and the following one. To prevent this from occurring, frequency agility is exploited.

Conveniently, each scanning cycle is completed in a time interval so as to guarantee a continuous coverage in the direction of azimuth.

Entering into further detail, the present invention includes:

a) transmission, via a RAR sensor, of a radar pulse using a narrow antenna beam so as to illuminate a portion (for example, having a width of 1000/N km) of the swath of interest with a high antenna gain; the pulse transmitted reaches the area illuminated by the beam starting from the closest edge and then propagating towards the furthest edge; in the same way, and with a timing equal to that of the signal transmitted, the echo signal back-scattered from the surface of the sea and/or from the target propagates and is received by the RAR sensor;

b) reception, via the RAR sensor, of the echo signal due to the transmitted pulse n in the time that elapses between transmission of the pulse "n" and transmission of the following pulse n+1 (i.e., in the PRI that elapses between transmission of the pulse n and transmission of the pulse n+1); reception occurs by means of an antenna beam that has the same characteristics as the one used in transmission so as to have a high antenna gain also in reception; and c) repetition of the operations described at points a) and b) for M consecutive PRIs (where M is an integer greater than two, preferably greater than N) and then re-pointing of the antenna beam towards a different sub-swath for which the operations described at points a) and b) are again performed M times; the elevation scanning cycle terminates when all the N sub-swaths have been observed so as to have in N×M PRIs a complete acquisition of the area of interest (i.e., of the global swath of interest).

As previously mentioned, elements characterizing a RAR for maritime surveillance are the SNR and the SCR and the product of the transmitted power and the gain necessary to guarantee high values of SNR and SCR.

Currently known RAR systems make use of low PRF values (typically comprised between 50 and 100 Hz) to guarantee:
   a non-ambiguous swath of the reference dimensions (approximately 1000 km); and
   decorrelation of the sea clutter between two successive echoes.

Furthermore, many of the currently known RAR systems use, both in transmission and in reception, a very wide antenna beam in the plane of elevation and, consequently, a low value of antenna gain to be able to observe extensive swaths, i.e., swaths having widths typically of approximately 1000 km. In this way, these RAR systems are not able to obtain a level of SNR sufficient to guarantee the required probability of detection (i.e., equal to or greater than 90%).

Instead, the present invention concerns an "incoherent" RAR scanning system, i.e., a RAR system that:
   uses an antenna beam which, in the plane of elevation (in particular, with reference to the cartesian reference system xyz represented in FIG. 1 and previously described, in the plane identified by the direction of nadir z and by the across-track direction y), is sufficiently narrow to guarantee the desired SNR;
   in use repositions, i.e., re-points, the antenna beam in the plane of elevation so as to cover the required swath (for example, having a width of approximately 1000 km) by observing in succession different areas of N sub-swaths that are parallel to the direction of azimuth, which are adjoining or partially overlapping and together form the required global swath;
   uses an operating PRF N times greater than that of a conventional RAR system so as to obtain a number of echoes sufficient to guarantee the required integration gain; and
   in use implements a frequency agility technique for decorrelating the sea clutter; in particular, it transmits, with the aforesaid operating PRF, a series of radar pulses, each of which occupies a respective frequency band that is separate from the frequency bands occupied by the radar pulses transmitted immediately before said radar pulse and immediately after said radar pulse.

Furthermore, as previously described, in the past there has also been proposed the possibility of using a scan in reception with narrow antenna beam, such as for example in the case of the partial-synthetic-aperture radar described in Ref1 and Ref2. In particular, the method of operation of said partial-synthetic-aperture radar includes:

1) transmission of a radar pulse using a wide antenna beam so as to illuminate the entire swath of interest (having a width of 1000 km) with a low antenna gain; the pulse transmitted reaches the area illuminated by the beam starting from the closest edge and then propagating towards the furthest edge; in the same way and with a timing equal to that of the signal transmitted, the echo signal back-scattered from the surface of the sea and/or from the target propagates and is received by the radar;

2) reception of the echo signal due to the transmitted pulse "n" in the time that elapses between transmission of the pulse "n" and transmission of the following pulse "n+1" (i.e., in the PRI that elapses between transmission of the pulse n and transmission of the pulse n+1); reception occurs by means of a narrow beam with high gain (in particular, P times narrower than the one used in transmission, with P≥5), which instantaneously covers only a fraction of the swath, and which hence must follow, by means of a scan in the plane of elevation, the echo signal according to how this is back-scattered during the PRI; and 3) repetition of the operations described at points 1) and 2) at each PRI for the entire period of operation of the radar.

It should then be noted that in the technique proposed in Ref1 and Ref2 scanning in reception is carried out within each PRI, whereas according to the present invention scanning is not carried out within each PRI but is carried out every M PRIs.

Furthermore, the partial-synthetic-aperture radar described in Ref1 and Ref2 uses a "low" PRF (in particular, 100 or 120 Hz) and a coherent processing of SAR (synthetic-aperture radar) type of the echo signals received. All this entails the presence of marked ambiguities that are, however, deemed, in Ref1 and Ref2, negligible in the process of detection of the targets. In Ref1 and Ref2, the only constraint imposed on the PRF (which, it is recalled, is the reciprocal of the PRI) is that it must be sufficiently low as to guarantee in each PRI acquisition of the echo coming from the swath observed. In Ref1 and Ref2 the timing of the scanning of the beam in reception is carried out within each PRI and hence does not require constraints on the PRF.

Instead, according to the present invention, the PRF (for example, 500 Hz) is constrained to the number of scanning positions (i.e., to the number of sub-swaths) in such a way as to guarantee, in the time allocated for each sub-swath according to the rules on timing that will be described in what follows, a sufficient number of PRIs and hence of pulses necessary to obtain the required integration gain. This constraint is not necessary in the technique proposed in Ref1 and Ref2 since the entire swath is constantly illuminated and all the pulses received can be integrated.

The aforesaid differences between the RAR system according to the present invention and the partial-synthetic-aperture radar described in Ref1 and Ref2 enable said RAR system according to the present invention to guarantee higher performance (in terms of SNR and SCR and hence of probability of detection and probability of false alarm) as compared to those of the partial-synthetic-aperture radar described in Ref1 and Ref2.

Finally, it should be recalled that, since the radar described in Ref3 makes sample acquisitions of discrete areas of the Earth's surface in order to make sample volumetric measurements, it clearly cannot be used for purposes of maritime surveillance, the aim of which is to identify targets over a very extensive area of sea by making surface measurements. In any case, it is here intended to point out that the mechanism of scanning and the purposes of the scanning described in Ref3 are completely different from those of the present invention.

In what follows, for simplicity of description, the RAR system according to the present invention will be sometimes called SCANRAR system to recall the characteristic of operation of said RAR system of re-pointing the antenna beam in the plane of elevation in such a way as to make a scan of the global swath by illuminating, selectively and in succession, N adjoining or partially overlapping sub-swaths.

Figure 2:
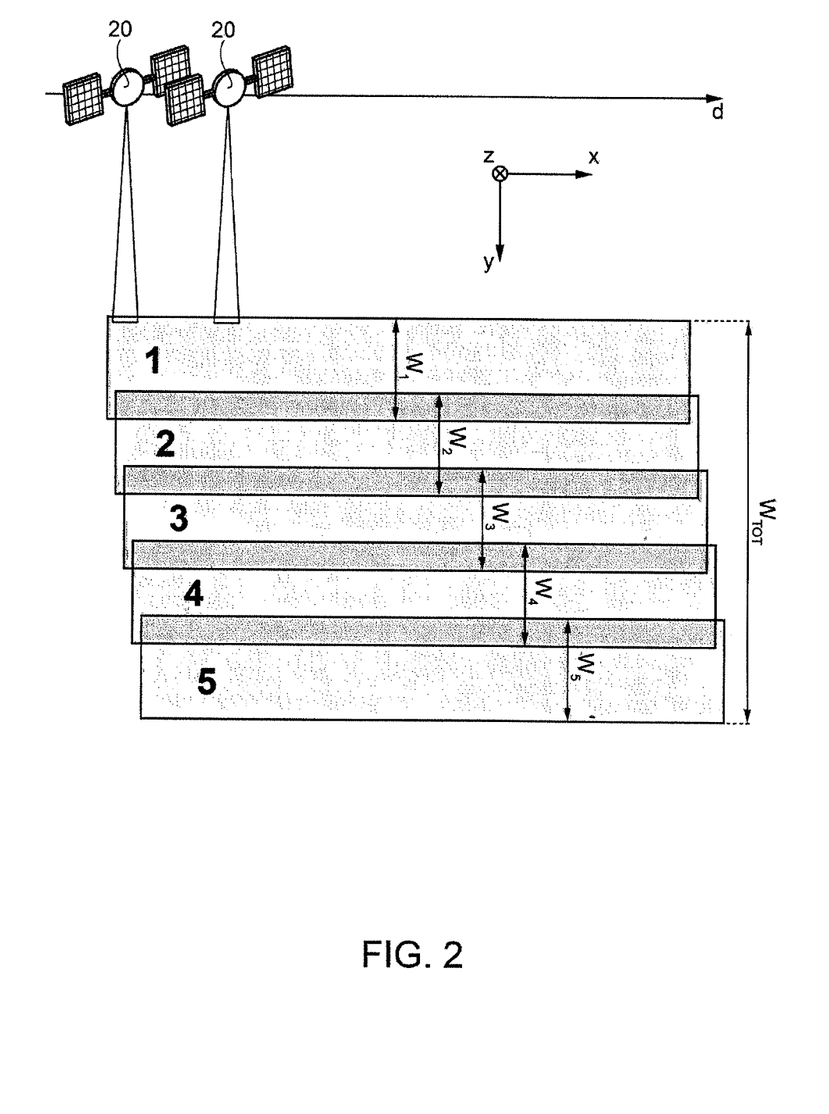
FIG. 2 is a schematic illustration of an example of logic of operation of a real aperture radar system according to the present invention.

For a better understanding of the present invention, FIG. 2 is a schematic illustration of an example of logic of operation of a SCANRAR system according to the present invention.

In particular, in the example illustrated in FIG. 2 the SCANRAR system re-points the antenna beam in the plane of elevation so as to execute a scan of a global swath of more than 1000 km by illuminating, selectively and in succession, different areas of N=5 partially overlapping sub-swaths, each of which has a width greater than 200 km.

In detail, FIG. 2 (where the cartesian reference system used corresponds substantially to the one previously introduced in FIG. 1) shows a satellite 20 that is equipped with a RAR sensor (not illustrated in FIG. 2 for simplicity of illustration) and that moves in a direction of flight d that identifies on the Earth's surface the direction of azimuth x. In the example illustrated in FIG. 2, the RAR sensor transmits, with a predefined operating PRF (for example, 500 Hz), radar pulses each with a respective elevation angle so as to illuminate, selectively and in succession, different areas of N=5 sub-swaths parallel to the direction of azimuth x and partially overlapping, each of which has a width $W_i$ (with i=1,2,3,4,5) greater than 200 km perpendicularly to the direction of azimuth x (i.e., parallelly to the across-track direction y). In this way, the RAR sensor on board the satellite 20 manages to observe a global swath having a width $W_{TOT}$ of more than 1000 km perpendicularly to the direction of azimuth x (i.e., parallelly to the across-track direction y).

Entering into further detail, the RAR sensor on board the satellite 20 carries out a series of operations of radar transmission and reception, each of which includes:

transmission of a radar pulse in a respective direction of pointing using a "narrow" antenna beam, i.e., with high gain, so as to illuminate a corresponding area of the Earth's surface with said transmitted radar pulse; and reception, in the direction of pointing, of the echo signal corresponding to said transmitted radar pulse (i.e., back-scattered from the area illuminated) using an antenna beam that has the same characteristics as the one used in transmission so as to have a high antenna gain also in reception.

The directions of pointing used by the RAR sensor on board the satellite 20 form:

all substantially one and the same squint angle, conveniently a right angle, with the direction of flight d; and each a respective elevation angle with the direction of nadir z.

In the example illustrated in FIG. 2, the angles in elevation used by the RAR sensor on board the satellite 20 are five (in general N), each of which corresponds to one of the N=5 sub-swaths to be observed.

In particular, the RAR sensor on board the satellite 20 in use transmits series of M radar pulses (where M is an integer greater than two, preferably greater than N), changing, at the end of each series of M pulses, the elevation angle used in such a way as to illuminate, selectively and in succession, partially overlapping areas of the five sub-swaths to be observed.

Specifically, in the example illustrated in FIG. 2, the RAR sensor on board the satellite 20, during displacement in the direction of flight d, observes (i.e., illuminates with a respective series of M radar pulses, and receives the corresponding echoes from):

a first area of the sub-swath designated in FIG. 2 by 1 using, in pointing of the antenna, a first elevation angle corresponding to said sub-swath 1;

a first area of the sub-swath designated in FIG. 2 by 2 using, in pointing of the antenna, a second elevation angle corresponding to said sub-swath 2, said first area of the sub-swath 2 partially overlapping with the aforesaid first area of the sub-swath 1;

a first area of the sub-swath designated in FIG. 2 by 3 using, in pointing of the antenna, a third elevation angle corresponding to said sub-swath 3, said first area of the sub-swath 3 partially overlapping with the aforesaid first area of the sub-swath 2;

a first area of the sub-swath designated in FIG. 2 by 4 using, in pointing of the antenna, a fourth elevation angle corresponding to said sub-swath 4, said first area of the sub-swath 4 partially overlapping with the aforesaid first area of the sub-swath 3;

a first area of the sub-swath designated in FIG. 2 by 5 using, in pointing of the antenna, a fifth elevation angle corresponding to said sub-swath 5, said first area of the sub-swath 5 partially overlapping with the aforesaid first area of the sub-swath 4;

a second area of the sub-swath 1 using, in pointing of the antenna, again the first elevation angle, said second area of the sub-swath 1 partially overlapping with the aforesaid first area of the sub-swath 1;

a second area of the sub-swath 2 using, in pointing of the antenna, again the second elevation angle, said second area of the sub-swath 2 partially overlapping with the aforesaid second area of the sub-swath 1 and partially overlapping with the aforesaid first area of the sub-swath 2;

and so forth.

It should be emphasized that the cyclic scanning scheme in elevation of the five sub-swaths described above is just one example of the different strategies of cyclic scanning in elevation that can be adopted. In fact, it should be pointed out that the SCANRAR system according to the present invention can conveniently use any predefined scheme of cyclic scanning in elevation of the N sub-swaths.

Preferably, the RAR sensor on board the satellite 20 in use implements the frequency agility in the following way:

for each i-th sub-swath (with i=1,2,3,4,5), the RAR sensor transmits in succession M respective radar pulses towards said sub-swath;

all the radar pulses transmitted by the RAR sensor have one and the same predefined bandwidth;

each of the M radar pulses transmitted in succession by the RAR sensor towards one and the same sub-swath occupies a respective frequency band that has said predefined bandwidth and is identified by a respective reference frequency (for example, the initial or central frequency) that is spaced apart, from the reference frequencies of the radar pulses transmitted immediately before and immediately after, by a first frequency hop that is slightly greater than the aforesaid predefined bandwidth and is smaller than the frequency hop that causes decoration of a possible target present in the scene observed;

the RAR sensor, for each i-th sub-swath (with i=1,2,3,4, 5), selects the reference frequencies of the M respective radar pulses transmitted in succession towards said sub-swath around a respective central transmission frequency; and the RAR sensor uses, for each i-th sub-swath (with i=1,2,3,4,5), a respective central transmission frequency that is spaced apart, from the central transmission frequencies used for the other sub-swaths, by a second frequency hop that is greater than the first frequency hop (conveniently, it is N times greater than the aforesaid predefined bandwidth) so as to reduce the effects of the ambiguities between the different sub-swaths.

The SCANRAR system according to the present invention enables improvement, as compared to a conventional system, of the useful signal by a factor 10 log(N) both in transmission and in reception. For instance, in the case illustrated in FIG. 2, the gain improves by a factor of 14 dB.

Furthermore, the method of operation of the SCANRAR system according to the present invention does not call for the development of new hardware, since it is possible to use the hardware already used in current SAR systems which operate in the so-called SCANSAR mode.

A key element of a RAR system is the integration gain IG obtained by adding a certain number of echoes to increase the SNR and the SCR. The integration gain IG requires, for all the echoes to be added together, that:

the target should remain coherent; and the clutter should be uncorrelated.

The correlation time $T_{corr}$ of the sea clutter depends upon the frequency used by the radar. In the X band, this time is approximately 20 ms. This implies that the maximum PRF to have decorrelation of the sea clutter between one pulse and another is:

$$PRF = \frac{1}{T_{corr}} = 50 \text{ Hz}.$$

Consequently, the use of an operating PRF of 500 Hz reduces the integration gain IG by approximately 10 dB, i.e., 10 log(500/50).

Use of frequency agility from one pulse to the following one hence serves to decorrelate the sea clutter, provided that the frequency hop between successive pulses is greater than the band of the pulse transmitted and smaller than the frequency hop that causes decorrelation also of the target.

As previously described, the SCANRAR system according to the present invention acquires the echo signal from the swath by observing, selectively and cyclically, N sub-swaths, i.e., by carrying out, in transmission and in reception, a scan of the antenna beams in the plane of elevation according to a predefined cyclic scanning scheme.

Conveniently, the sub-swaths partially overlap at the edges so as to guarantee coverage, without any discontinuity, in a direction perpendicular to the direction of azimuth x, i.e., parallel to the across-track direction y. The time at which each sub-swath is observed is defined in such a way as to guarantee continuous coverage in the direction of azimuth x. The operating PRF is chosen in such a way as to avoid returns ambiguous in range. In particular, the value of the operating PRF is conveniently defined according to the following equation:

$$PRF \leq \frac{c}{2W_{SSW}} \qquad (1)$$

where c is the speed of light and $W_{SSW}$ is the width of the sub-swath perpendicularly to the direction of azimuth x, i.e., parallelly to the across-track direction y.

The integration time (i.e., the time in which the SCANRAR system transmits to, and receives from, one and the same sub-swath) is defined so as to avoid any discontinuity of coverage in the direction of azimuth. The choice of the values is made according to the following equation:

$$TF_j = TD_j + TR_j, \forall j \qquad (2)$$

where j is the sub-swath considered (where j is comprised between 1 and N), $TF_j$ is the total time in which a pointlike target could be observed if no scan were made, $TD_j$ is the "dwell time" or time of observation of each sub-swath, and $TR_j$ is the "return time" or time required to avoid any discontinuity of observation in the direction of azimuth x in each single sub-swath.

The time $TF_j$ in which a pointlike target could be observed if no scan were made can be calculated on the basis of the following equation:

$$TF_j = \frac{0{,}88\lambda R_j}{v_{gi} L} \quad (3)$$

where $v_{gi}$ is the velocity of the beam on the Earth's surface at a distance ("slant range") $R_j$ from the antenna of the SCANRAR system, $\lambda$ is the wavelength used, and L is the length of the antenna of the SCANRAR system in a direction parallel to the direction of flight d, i.e., to the direction of azimuth x.

As previously described, the integration gain IG requires, for the number of echoes to be added together, that:
  the target should remain coherent; and
  the clutter should be uncorrelated.

To improve the signal-to-noise ratio SNR a large number of echoes should be added together; this implies a high value for the PRF. The correlation time $T_{corr}$ of the sea clutter depends upon the frequency used. In the X band, this time is approximately 20 ms. This implies that the maximum pulse repetition frequency $PRF_{MAX}$ that guarantees decorrelation of the sea clutter is given by the following equation:

$$PRF_{MAX} = \frac{1}{T_{corr}}. \quad (4)$$

For instance, in the X band the maximum PRF that guarantees decorrelation of the sea clutter is equal to 50 Hz. The use of higher PRFs (as required to improve the SNR) would reduce the factor IG by a term Loss equal to:

$$\text{Loss} = 10 \log(PRF \cdot T_{corr}) \quad (5)$$

The use of frequency agility decorrelates the sea clutter assuming that the frequency hop is greater than the band of the pulse transmitted and smaller than the frequency hop that causes decorrelation of the target itself. An empirical estimate of the minimum frequency $f_{decorr}$ that causes decorrelation of the target can be made using the following equation:

$$f_{decorr} \geq \frac{c}{2D} \quad (6)$$

where c is the speed of light, and D is the size of the generic target that is to be detected.

The number $N_{freq}$ of frequency hops to be used before returning to the initial value is given by the following equation:

$$N_{freq} = T_{corr} \cdot PRF \quad (7)$$

The previously defined constraints on timing simultaneously guarantee the continuity of the coverage in the direction of azimuth and the completion of the scanning cycle for the entire swath of interest. In particular, said constraints on the timing of the scanning cycle guarantee for the SCAN-RAR system a continuous coverage in the direction of azimuth, causing, in each scanning cycle, the antenna beam corresponding to the i-th sub-swath to illuminate an area that, in the direction of azimuth, partially overlaps with the one illuminated in the previous scanning cycle.

Figure 3:
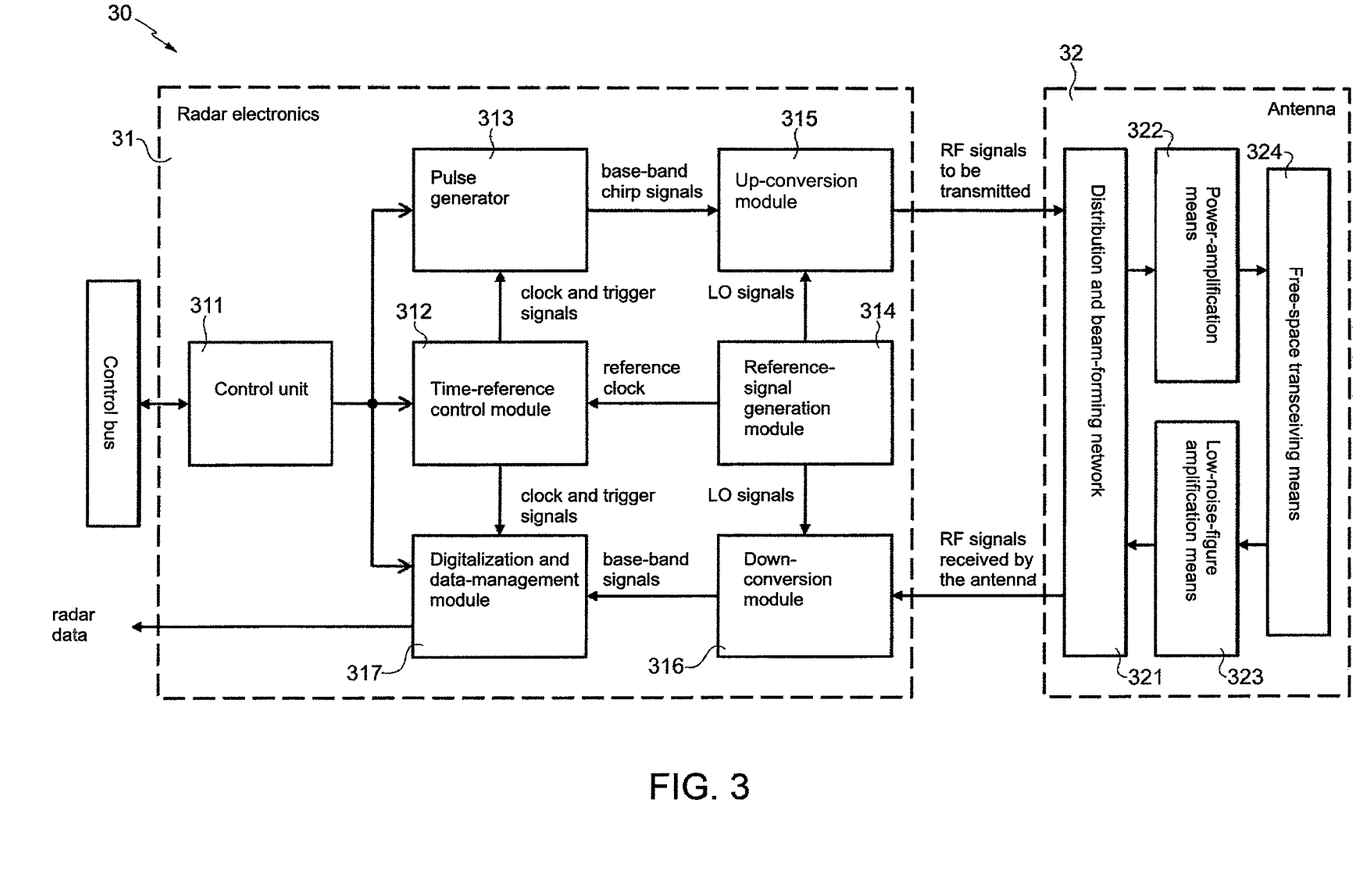
FIG. 3 is a schematic illustration of a functional architecture provided by way of example of a monostatic real aperture radar system according to a preferred embodiment of the present invention.

Illustrated in FIG. 3 is a functional block diagram that represents a functional architecture provided by way of example of a monostatic RAR system (designated as a whole by 30) according to a preferred embodiment of the present invention.

In particular, as illustrated in FIG. 3, the RAR system 30 mainly includes two sub-systems: a radar electronics 31 and an electronically steerable antenna 32.

In detail, the radar electronics 31 is configured to:
  manage and control the entire RAR system 30 (for example, as illustrated in FIG. 3, by means of a control unit 311);
  synchronize the operations executed (for example, as illustrated in FIG. 3, by means of a time-reference control module 312);
  generate the radar pulses to be transmitted (the so-called "band-base chirp signals") (for example, as illustrated in FIG. 3, by means of a pulse generator 313);
  generate the reference frequencies for transmission (for example, as illustrated in FIG. 3, by means of a reference-signal generation module 314);
  frequency shift the pulses to be transmitted so as to bring them from the base band to the transmission frequencies (conveniently amplifying them and filtering them) (for example, as illustrated in FIG. 3, by means of a so-called "up-conversion module" 315);
  frequency shift the radiofrequency (RE) echo signals received by the antenna 32 so as to bring them from the reception frequencies to base band (conveniently amplifying them and filtering them) (for example, as illustrated in FIG. 3, by means of a so-called "down-conversion module" 316); and
  perform an analog-to-digital conversion of the echo signals received and brought to base band and handle the data (conveniently compressing them and formatting them) (for example, as illustrated in FIG. 3, by means of a digitalization and data-management module 317).

Furthermore, the electronically steerable antenna 32 is configured to:
  synthesize, in transmission and reception, the desired antenna beams, i.e., generate the antenna beams with the desired form, pointing, and gain (for example, as illustrated in FIG. 3, by means of a distribution and beam-forming network 321);
  carry out scanning of the antenna beam in the plane of elevation;
  perform power amplification of the signals to be transmitted (for example, as illustrated in FIG. 3, via power-amplification means 322);
  perform amplification with low noise figure of the echo signals received (for example, as illustrated in FIG. 3, via amplification means with low noise figure 323); and
  radiate the signals to be transmitted and receive the echo signals (for example, as illustrated in FIG. 3, by free-space transceiving means 324).

Conveniently, the RAR system 30 can be obtained by exploiting the conventional hardware of a SAR system that operates in SCANSAR mode and that employs a programmable pulse generator.

The key elements of the RAR system 30 are the pulse generator 313 and the electronically steerable antenna 32.

The pulse generator 313 in use generates the waveforms (pulses) to be transmitted with the characteristics required by the application. In particular, each radar pulse generated in use by the pulse generator 313 has a respective (predefined) duration and occupies a respective (predefined) frequency band identified by a respective (predefined) reference frequency (for frequency agility).

The pulse generator 313 can be conveniently obtained using either analog technologies, for example using surface-acoustic-wave (SAW) devices, or digital technologies, for example architectures of a MRO (Memory Read Out) type or of a DDS (Direct Digital Synthesis) type.

Preferably, the pulse generator 313 is based upon a DDS architecture. In fact, this solution optimises the choice of the waveform parameters (duration, band, starting frequency), guaranteeing the maximum flexibility for frequency agility.

The antenna 32 can be conveniently obtained using:
a so-called "phased array" of an active type; or else
a reflector illuminated by
    a set, or cluster, of feeds with power-amplification concentrated in a single device, or
    an active feed array.

From the foregoing description, the advantages of the present invention are immediately clear.

In particular, it should be emphasized that the RAR system and the corresponding method of operation according to the present invention enable very extensive swaths to be observed, in particular swaths having a width of the order of approximately 1000 km, with a spatial resolution of the order of tens of meters, or, in any case, with a spatial resolution comparable with the dimensions of the targets that are to be detected, in particular ships. Consequently, the present invention finds advantageous, albeit non-exclusive, application in maritime surveillance.

The invention claimed is:

1. A method of operation of a real aperture radar system for surveillance of the Earth's surface, said real aperture radar system being installed on a space vehicle/platform that moves in a direction of flight and comprising a transceiving antenna, or a transmitting antenna and a receiving antenna, which is/are electronically steerable; the method comprising the steps of:
   a) transmitting, via the transceiving/transmitting antenna, a series of M radar pulses towards a swath of the Earth's surface parallel to the direction of flight using an antenna beam pointed at said swath, wherein M is an integer greater than two;
   b) for each of the M radar pulses transmitted, receiving, via the transceiving/receiving antenna, a corresponding echo signal during the time interval that elapses between transmission of said radar pulse and transmission of the following radar pulse using the same antenna beam as the one used for transmitting the M radar pulses;
   c) carrying out elevation scanning cycles, wherein each elevation scanning cycle is carried out by a first sequence of steps repeating N times, wherein N is an integer greater than 1 corresponding to N swaths of the Earth's surface that are parallel to the direction of flight and are adjoining or partially overlapping, the sequential steps of:
      1. performing a second sequence of steps, M times, of a transmitting step a) followed by a receiving step b);
      2. electronically changing the direction of pointing in elevation of the antenna beam;
   whereby, at each elevation scanning cycle, the radar pulses are transmitted towards, and the echo signals are received from, the N swaths; and
   wherein all the radar pulses are transmitted:
      with a predefined pulse repetition frequency and a predefined timing of the scanning cycle such that to guarantee a complete coverage of each of the N swaths parallelly to the direction of flight; and
      by using frequency agility techniques to decorrelate sea clutter and to minimize ambiguities among different swaths;
   wherein all the transmitted radar pulses have one and the same predefined bandwidth;
   the M radar pulses transmitted, in an elevation scanning cycle, towards one and the same swath occupy, each, a respective frequency band that has said predefined bandwidth and is identified by a respective reference frequency that is spaced apart, from the reference frequencies of the radar pulses transmitted immediately before and immediately after, by a first frequency hop that is greater than said predefined bandwidth;
   the reference frequencies of the M radar pulses transmitted, in an elevation scanning cycle, towards one and the same swath are selected around one and the same central transmission frequency;
   in each elevation scanning cycle, a respective central transmission frequency is used for each swath, which respective central transmission frequency is spaced apart, from the central transmission frequencies used in said elevation scanning cycle for the other swaths, by a second frequency hop that is greater than the first frequency hop; and
   wherein the first frequency hop is smaller than a value that indicates the minimum frequency hop that causes a decorrelation of a target illuminated by two successive radar pulses having reference frequencies spaced apart by at least said minimum frequency hop; and is related to a reference size of a generic target to be detected by the real aperture radar system.

2. The method of claim 1, wherein the second frequency hop is greater by a factor up to N than the predefined bandwidth.

3. The method according to claim 1, wherein the direction of pointing of the antenna beam is defined by an elevation angle with respect to the nadir of the real aperture radar system and by a squint angle with respect to the direction of flight; and wherein each elevation scanning cycle is carried out by repeating N times the operations a) and b), electronically changing, each time, the elevation angle and keeping the squint angle constant.

4. The method according to claim 1, wherein the predefined pulse repetition frequency is:
   greater than a first value indicating the maximum pulse repetition frequency that guarantees a decorrelation of the clutter; and
   smaller than, or equal to, a second value related to a width of the N swaths perpendicularly to the direction of flight.

5. The method according to claim 1, wherein the predefined pulse repetition frequency is 500 Hz.

6. The method according to claim 1, wherein M is an integer greater than N.

* * * * *